Figure 1:
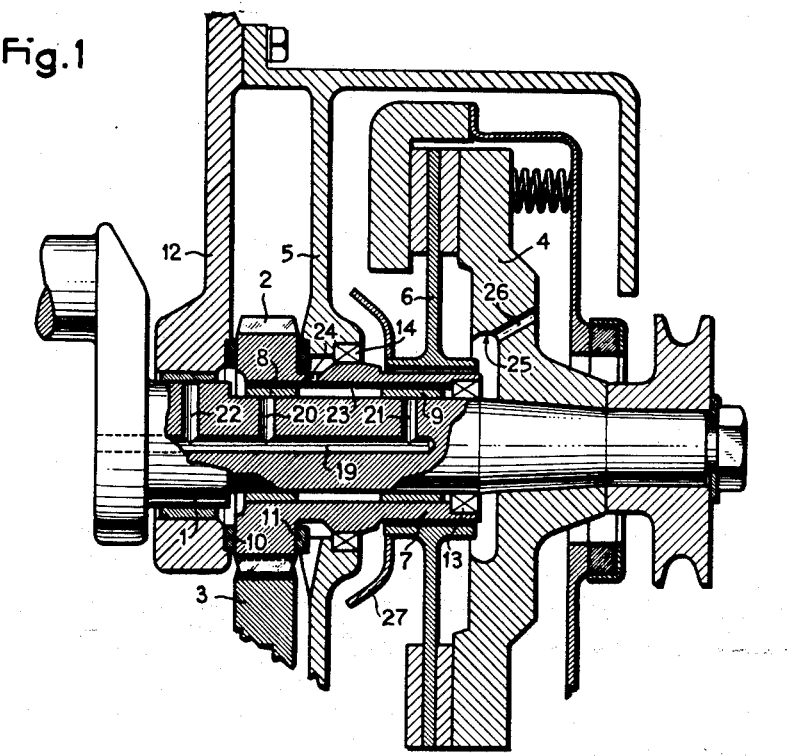

Sept. 21, 1965         M. DANGAUTHIER                3,207,280
                DRIVE OF THE INPUT SHAFT OF A GEARBOX
                      Filed June 12, 1963

INVENTOR
MARCEL DANGAUTHIER

LeBlanc + Shur
ATTORNEYS

United States Patent Office 3,207,280
Patented Sept. 21, 1965

3,207,280
DRIVE OF THE INPUT SHAFT OF A GEARBOX
Marcel Dangauthier, Paris, France, assignor to Societe d'Etudes et d'Applications Industrielles, Commerciales et Immobilieres "Inter-Technique," Paris, France
Filed June 12, 1963, Ser. No. 287,393
Claims priority, application France, July 12, 1962, 903,844
1 Claim. (Cl. 192—110)

The invention relates to gearboxes whose shafts are parallel with the crankshaft, the input shaft of the gearbox being driven by a gear rotatively mounted on the crankshaft and driven by the driven part of a dry clutch.

In this type of transmission the gear in question must be located within the housing of the gearbox or in a housing common to this gearbox and the crankshaft and must comprise an extended portion connected to the driven part of the clutch located in the clutch housing.

There is consequently a great length of bearing surface between, on one hand, the gear and its extended portion and, on the other, the crankshaft, and thrust bearings are required when the gears have helical teeth together with sealing elements preventing the lubricant of the various bearings from reaching the friction surfaces of the dry clutch. Owing to these features of the assembly, the frictions between the driving gear and the crankshaft on the one hand and the fixed parts on the housing, on the other, are added to the inertia of the gear and impair the satisfactory synchronization when changing the speeds.

The object of the invention is to reduce these frictions to a minimum so as to facilitate the synchronization. Another object is to provide an assembly wherein the sealing can be obtained or regulated independently of the clutch and before the latter has been placed in position.

Owing to considerations of space consumption and cost price it is necessary to mount the gear on the crankshaft by means of smooth sleeves or bushings and to constitute the thrust bearings between the gear and the fixed parts of the housings by thrust washers. In order to obtain an effective seal, preference is given to sealing elements comprising a flexible lip which is, if necessary, pressed by a spring against the crankshaft so as to prevent infiltrations of oil into the clutch housing.

According to the invention, the smooth sleeves or bushings between the drive gear and the crankshaft and the thrust washers are so arranged as to be lubricated by the pressurized greasing system comprising apertures in the crankshaft and grooves in the smooth sleeves, a sealing element being directly mounted on the crankshaft between the latter and the gear on the clutch side.

According to another feature of the invention, said sealing element communicates with the clutch housing within an annular recess provided in the driving disc of the clutch for collecting any lubricant which might be projected by centrifugal force, this recess communicating with the outer face of said driving disc through one or a plurality of apertures.

Further features and advantages of the invention will be apparent from the ensuing description, with reference to the accompanying drawing to which the invention is in no way limited.

Figure 2:
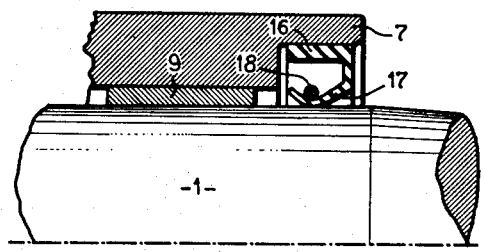

In the drawing:

FIGURE 1 shows by way of example a longitudinal sectional view of the device according to the invention, and FIGURE 2 is a sectional view of a sealing element.

With reference to the drawing, the reference character 1 designates the crankshaft of the engine on which is freely rotative the drive gear 2 driving a gear 3 which is keyed on the input shaft of the gearbox, the axis of this shaft being parallel with that of the crankshaft. Crankshaft 1 includes a straight portion or journal secured to the end of which is the driving disc 4 of a clutch which operates in the dry condition and is contained in a housing of which reference character 5 designates the common wall separating this housing from the motor housing which could, if desired, also enclose the gearbox. The clutch disc 6, which can be engaged with the disc 4 by conventional means, is rendered connected to an extended portion 7 of the gear 2 extending into the clutch housing.

The gear 2 is mounted on the crankshaft by means of two smooth sleeves or bushings 8 and 9. If, as is often the case, the gears 2 and 3 have helical teeth an axial component results and the gear is held in position along the crankshaft by interposing thrust washers 10 and 11 between the sides of the gear 2 and the wall 5, on the one hand, and a web or support 12 of the engine housing on the other.

To prevent the lubricant from entering the clutch housing, a sealing element 13 must be disposed at the end of the extended portion 7 of the gear and a sealing element 14 must be placed in the region in which said extended portion extends through the wall 5. The sealing element 13 is advantageously constituted by element such as shown in FIGURE 2 comprising a ring of flexible material 16 having a collar engaged in a bore in the extended portion 7 of the gear 2 and a thin lip 17 which bears against the crankshaft; it can also comprise a spring 18 which presses the lip 17 against the crankshaft. The sealing element 14 can be of a similar type and has not been shown in detail.

The gear 2 is consequently subjected to four friction torques namely:

A torque $C_1$ in the region of the sleeves 8 and 9;
A torque $C_2$ in the region of the sealing element 13;
A torque $C_3$ in the region of the thrust bearings 10 and 11;
A torque $C_4$ in the region of the sealing element 14.

The torques $C_1$ and $C_2$ contribute to the driving of the gear 2 by the crankshaft owing to the effect of friction when the clutch is disengaged, the gearbox being in the neutral position. On the other hand, the torques $C_3$ and $C_4$ tend to brake the gear 2.

Generally speaking, it is advantageous that these various torques be as small as possible so as to obtain a satisfactory synchronization. Further, in order to engage the speeds when the vehicle is stationary and the engine is rotating it is necessary that the gear 2 be stationary and for this purpoe $C_3+C_4$ should exceed $C_1+C_2$.

This is obtained in accordance with the invention by the following means:

The sleeves 8 and 9 are lubricated by oil under pressure fed through apertures 19, 20 and 21 in the crankshaft; the aperture 22 lubricates the bearing in the web 12. The oil in excess serves to lubricate the thrust washer 10.

The longitudinal grooves 23 and the apertures 24 evacuate the oil in excess flowing from the sleeves 8 and 9, prevent the sealing element 13 from being put under pressure and insure the lubrication of the thrust washer 11. The sealing elements 13 and 14 prevent the oil from entering the clutch housing.

Owing to the aforementioned arrangements, the frictional torques exerted on the gear 2 are minimum so that changing the speeds of the gearbox when running does not require a large synchronization effort. In particular, when the engine is idling the gearbox being in the neutral position, the gear 2 is not driven in rotation by the crankshaft and this avoids the difficulties of engaging the first speed and reverse speed with the vehicle stationary. Indeed, the torques $C_1$ and $C_2$ are minimum owing to lubrication by the oil under pressure and to the fact that the lip of the sealing element 13 bears on a small diameter (crankshaft), which results in a minimum frictional torque exerted by the sealing element. This frictional torque can be reduced still more owing to the fact that the initial clamping of the lip of the element 13 on the crankshaft when mounting can be reduced to a minimum compatible with a satisfactory seal at all engine speeds. This seal is statically insured by the initial clamping but centrifugal force tends to reduce this clamping at high speed and impair the seal; the small diameter of the crankshaft permits reducing this effect of centrifugal force to a minimum. The torque $C_3$ is small owing to the abundant lubrication of the thrust washers and the low axial forces when disengaging the clutch. The torque $C_4$ can be very small in selecting a sealing element composed of a material having a small coefficient of friction. The sum $C_1+C_2$ can be made about equal to, or less than, the sum $C_3+C_4$ so that with the clutch disengaged and the gearbox in neutral position the gear 2 remains stationary.

As an additional safeguard, in order to counter a defect in the seal afforded by the element 13, the side of the disc 4 facing the disc 6 can be recessed in the form of a dish or cup which is defined exteriorly by an annular groove 25 adapted to receive any accidential escape of oil, this oil being evacuated to the outside of the disc through an aperture 26 under the effect of centrifugal force. There is then no danger of this oil dirtying the friction surfaces of the clutch.

For a similar purpose a safety deflector 27 can be secured to the disc 6 in front of the outlet of the sealing element 14 so as to prevent an escape of oil reaching the friction surfaces.

It will be observed that the arrangement adopted is such that the sealing elements can be mounted and regulated before the clutch has been placed in position and that this regulation is not affected by the mounting or dismantling of the clutch, which can be carried out without any special precautions.

The fact that the drive gear 2 is maintained in position by thrust washers 10 and 11 avoids the necessity of retaining it by means of a clip engaged in a groove formed in the crankshaft in the conventional manner. This avoids weakening the crankshaft in the vicinity of the clutch.

Although specific embodiments of the invention have been described, many modifications and changes may be made therein, without departing from the scope of the invention as defined in the appended claim.

Having now described my invention what I claim as new and desire to secure by Letters Patent is:

In a gearbox-driving device: a crank-case, a crankshaft comprising a journal rotatively mounted in said crank-case and supported by said crank-case, a clutch housing, said crank-case and said clutch housing having a common wall; said journal having an end portion, at least a part of said end portion being housed in said clutch housing; a clutch having a driving part fixed on said end portion, in said clutch housing; bushings mounted directly on said journal freely rotatable thereon and lubricated by oil under pressure, a gearbox-driving gear having a sleeve-like extended portion extending through said common wall into said clutch housing, said gear and said extended portion being mounted on said bushings to rotate therewith; a driven part of said clutch slidably mounted on and drivingly connected to said extended portion to rotate said gear; a first sealing element mounted directly on said journal in a recess formed in the end of said extended portion, inside said clutch housing, and a second sealing element mounted on said extended portion in a recess formed in said common wall; and an oil deflector fixed to said driven part, said second sealing element being located within said deflector in the region in which said extended portion extends through said common wall.

References Cited by the Examiner

UNITED STATES PATENTS

| | | | |
|---|---|---|---|
| 2,090,123 | 8/37 | Hoffman | 192—20 X |
| 2,103,543 | 12/37 | McCormick et al. | 74—701 |
| 2,913,927 | 11/59 | Issigonis | 74—701 |

FOREIGN PATENTS 762,651    12/56    Great Britain.

DON A. WAITE, *Primary Examiner.*

DAVID J. WILLIAMOWSKY, *Examiner.*